(12) United States Patent
Becks

(10) Patent No.: US 12,247,682 B2
(45) Date of Patent: Mar. 11, 2025

(54) CLAMPING APPARATUS

(71) Applicant: Airbus Operations GmbH, Hamburg (DE)

(72) Inventor: Ralf Becks, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 146 days.

(21) Appl. No.: 17/979,875

(22) Filed: Nov. 3, 2022

(65) Prior Publication Data
US 2023/0160506 A1     May 25, 2023

(30) Foreign Application Priority Data
Nov. 22, 2021 (EP) .................................. 21209665

(51) Int. Cl.
    *F16L 23/10*     (2006.01)
    *F16L 23/16*     (2006.01)
    *F16L 23/18*     (2006.01)

(52) U.S. Cl.
    CPC ............. *F16L 23/10* (2013.01); *F16L 23/162* (2013.01); *F16L 23/18* (2013.01)

(58) Field of Classification Search
CPC ....... F16L 23/032; F16L 23/036; F16L 23/04; F16L 23/08; F16L 23/24; F16L 23/10; F16L 23/162; F16L 23/18
USPC ................... 285/123.3, 87, 91, 45, 420, 373
See application file for complete search history.

(56) References Cited

U.S. PATENT DOCUMENTS

| | | | | |
|---|---|---|---|---|
| 1,862,515 A * | 6/1932 | Gray | ....................... | F16L 23/04 |
| | | | | 285/420 |
| 1,879,565 A * | 9/1932 | Smith | ..................... | F16L 33/23 |
| | | | | 285/253 |
| 2,424,436 A * | 7/1947 | Crater | ..................... | F16L 23/08 |
| | | | | 285/408 |
| 2,717,788 A * | 9/1955 | Raynes | ................... | F16L 23/08 |
| | | | | 285/411 |
| 2,896,978 A | 7/1959 | Schumacher | | |

(Continued)

FOREIGN PATENT DOCUMENTS

KR     20190048428 A     5/2019

OTHER PUBLICATIONS

European Search Report dated May 4, 2022; priority document.

*Primary Examiner* — David Bochna
(74) *Attorney, Agent, or Firm* — Greer, Burns & Crain, Ltd.

(57) ABSTRACT

A clamping apparatus connecting tube flanges, includes first and second bracing devices. The first bracing device connects first and second mounting devices and has a partially circular shape with a first inner and a first outer wall. The second bracing device connects first and second connecting devices. The first bracing device inner wall has a first recess. The first bracing device outer wall is configured to contact the second bracing device which is configured to contact the first bracing device outer wall to apply substantially radial force on that first outer wall. The first recess shape is configured to substantially convert the radial force applied to the first bracing device outer wall into an axial force inside the first inner wall. The first and second mounting devices each comprise at least two attachment devices connecting the first and second connecting devices of the second bracing device.

20 Claims, 3 Drawing Sheets

(56) References Cited

U.S. PATENT DOCUMENTS

| | | | | |
|---|---|---|---|---|
| 3,013,821 | A * | 12/1961 | Bogan | F16L 23/08 |
| | | | | 285/407 |
| 3,517,701 | A * | 6/1970 | Smith | F16L 55/179 |
| | | | | 285/373 |
| 5,375,888 | A * | 12/1994 | Ikeda | F16L 21/06 |
| | | | | 285/373 |
| 5,415,435 | A * | 5/1995 | Colbert | F16L 23/08 |
| | | | | 285/419 |
| 5,462,312 | A * | 10/1995 | Carpenter | F16L 7/00 |
| | | | | 285/419 |
| 6,079,753 | A * | 6/2000 | Erwin | F16L 23/032 |
| | | | | 285/414 |
| 6,398,270 | B1 * | 6/2002 | Fukui | F16L 21/06 |
| | | | | 285/420 |
| 6,971,682 | B2 * | 12/2005 | Hoang | F16L 37/565 |
| | | | | 285/123.3 |
| 8,210,210 | B2 * | 7/2012 | Clark | F16L 55/179 |
| | | | | 285/373 |
| 10,781,948 | B1 * | 9/2020 | Gregory | F16L 23/032 |
| 11,519,538 | B2 * | 12/2022 | Wallace | F16L 23/22 |
| 2004/0094958 | A1 * | 5/2004 | Treverton | F16L 23/04 |
| | | | | 285/373 |
| 2007/0296213 | A1 * | 12/2007 | Jones | F16L 55/172 |
| | | | | 285/373 |
| 2010/0037974 | A1 | 2/2010 | Fernandes et al. | |
| 2022/0128181 | A1 * | 4/2022 | Trummer | F16L 23/10 |
| 2022/0275893 | A1 * | 9/2022 | Pesenti | F16L 23/08 |

\* cited by examiner

CLAMPING APPARATUS

CROSS-REFERENCES TO RELATED APPLICATIONS

This application claims the benefit of the European patent application No. 21209665.5 filed on Nov. 22, 2021, the entire disclosures of which are incorporated herein by way of reference.

FIELD OF THE INVENTION

The present invention relates to the technical field of aeronautics. In particular, the present invention relates to a clamping apparatus, a clamping system, a tube system and an airplane.

BACKGROUND OF THE INVENTION

Airplanes use a great variety of tube systems. Tube systems usually distribute materials, liquids, gases and/or aerosols to the different locations where they are needed. These materials may have different chemical and/or physical properties. For example, the transported materials may react with other elements, such as the elements used for the material of the tube system. Or they may have different temperatures and/or pressure.

When developing a Zero-Emission airplane, the use of hydrogen (H2) is relevant. For distributing H2 to engines or fuel-cells, a distribution system is needed which comprises different types of tube systems. Such distribution systems used for the transport of H2 usually are double-walled allowing the detection of any leakage of H2.

For instance, a hose-in-shroud design is used to transport H2 within an airplane where a hose is surrounded by a jacket.

When linking the tubes and/or hoses for a hose-in-shroud system special care needs to be taken in order to prevent leakage of H2.

SUMMARY OF THE INVENTION

It might be seen as an object of the invention to provide an efficient connection for tube systems.

According to an aspect a clamping apparatus for connecting flanges of tubes and/or hoses is provided. The clamping apparatus comprises a first bracing device and a second bracing device.

The first bracing device connects a first mounting device and a second mounting device. The first bracing device has a partially circular shape with a first inner wall and a first outer wall. In an example, the first bracing device is arranged between the first mounting device and the second mounting device. In one example, the shape is half circular shape. In another example, the shape is a quarter circular shape.

The second bracing device connects a first connecting device and a second connecting device. In an example, the second bracing device is arranged between the first connecting device and the second connecting device.

The first inner wall of the first bracing device has a first recess, and the first outer wall of the first bracing device is adapted to contact the second bracing device.

The second bracing device is adapted to contact the first outer wall of the first bracing device in order to apply substantially radial force on the first outer wall of the first bracing device.

In an example, the first outer wall and/or the surface of the first outer wall is adapted in such way that the second bracing device is able to stably contact the first outer wall. In an example, the first outer wall has a substantially plane surface in order to allow for a good contact with a substantially plane surface of the second bracing device. A good contact between the first bracing device and the second bracing device may allow for a good force distribution and/or for a good protection.

The shape of the first recess is adapted to substantially convert the radial force applied to the first outer wall of the first bracing device into an axial force inside the inner wall. The force in an axial direction of a tube may help to press two flanges of two tubes to be connected together in order to form a sealed connection between the two tubes.

The first mounting device and the second mounting device each comprise at least two attachment devices for connecting the first connecting device and the second connecting device of the second bracing device. In this way, the first and second bracing devices may be joined. The attachment devices may also allow for aligning the first and second bracing devices and/or to generate a force in a radial direction.

The clamping apparatus may offer an intrinsic redundancy for the clamping apparatus when used for a tubular distribution system. The clamping apparatus may prevent loss or damage of the system due to a single failure. The size of the clamping apparatus is small enough to be fed through a jacket and/or a shroud. The clamping apparatus may avoid a single failure outage and may allow for continuously using of a tube system even in cases where a single part of the clamping apparatus breaks.

It may be seen as an idea of the invention to introduce a second load-path for the clamp and to use a high number of fixing devices, attachment devices and/or mounting devices in order to maintain the functionality of a connection linked by the clamping apparatus even when one single part of the clamping apparatus breaks. At the same time, the dimension of the whole clamping apparatus and/or of a clamping system may be kept small enough to be fit into a shroud and/or a jacket. In an example, the clamping apparatus uses four bolts instead of one or two and therefore may still meet the requirements of holding a tube system together after one bolt is damaged and/or lost.

In another example, both the first bracing device and the second bracing device are adapted to generate the force in the radial direction and to convert it in a force which substantially is effective in the axial direction. The force may be generated by pressing the first and second mounting devices and/or the first and the second connecting devices against a mount. The mount may be another clamping apparatus and/or a wall. This pressing force may be used to decrease a diameter of a substantially circular opening formed by the circular shape of any of the bracing devices and, as a result, clamping a tube connection which is inside the substantially circular opening. In general, the contour of the opening of the first bracing device and/or the second bracing device is adapted to the contour of the cross section the tube to be connected.

In case the first bracing device fails, the pressure can still be generated by the second bracing device. In case the second bracing device fails, the pressure can still be generated by the second bracing device. In other words, the first bracing device is adapted as a first load-path, the second bracing device is adapted as a second load-path. The first and second load paths may substantially be independent from another.

According to another aspect, the first recess has a V-shape. The V-shape may help converting a substantially radial force into an axial force. The V-shape may extend along the inner wall of the first bracing device in a circumferential direction.

According to yet another aspect, the second bracing device is at least partially made of a substantially flexible material and/or designed as a flexible element.

The flexible element may be a wire, a ribbon, a band, a strap and/or a belt. Such element, particularly when made of steel, in particular stainless steel, may help to apply a force onto the first bracing device and may build a second loadpath. In case the first bracing element fails the second bracing element may still hold the clamping apparatus together and vice versa.

According to a further aspect, the second bracing device is at least partially made of a substantially rigid material and thus supports the first bracing element.

According to another aspect, the second bracing device has a partially circular shape with a second inner wall and a second outer wall, wherein the second inner wall of the second bracing device has a second recess. The shape of the second recess is adapted to engage with the first outer wall of the first bracing device. In an example, the contour of an opening of the second bracing device may be adapted to the contour of the cross section the outer wall of the first bracing device.

The form of the second bracing device may substantially correspond to the form of the first bracing device. The second bracing device may take into account that the first bracing device needs to be covered and therefore the size of the second bracing device is larger than the size of the first bracing device.

In this way, the second bracing device maybe adapted to cover the first bracing device and may help to prevent that a single failure, e.g., a break and/or crack in the first bracing device, damages the whole tube system.

According to another aspect, the second recess has a V-shape and thus the shape of the second recess is substantially similar to the first recess. The V-shape may help to introduce a force in a substantially axial direction into the first bracing device.

According to yet another aspect of the present invention, the at least two attachment devices are adapted to receive at least one of the fixing devices selected from the group of fixing devices consisting of a bolt, a pin, a screw, a clip; and a rivet.

The fixing devices may be combined with the at least two attachment devices in order to connect the first bracing device and the second bracing device. In another example, the fixing devices may also be used to mount the first and/or second bracing device to a mount and/or to another clamping apparatus.

According to a further aspect, the first bracing device and the second bracing device are connected to another.

The connection may combine the bracing devices to form a clamping system which is tolerant to a single failure.

According to another aspect, the first bracing device and the second bracing device are connected by a hinge. The hinge may prevent disassembling of the first bracing device and the second bracing device in case of a single failure.

Connecting and/or joining the first bracing device and the second bracing device may remind a worker to fix both devices. In other words, the first bracing device and the second bracing device and/or the first and second clamps are joined together in order to allow proper installation substantially only after both bracing devices are correctly mounted to another. The hinge, for example, can comprise an elastic element and/or a spring element in order to prevent mounting the clamping apparatus to the tube without fixing the first and second bracing devices to another. In a case where the first and second bracing devices were not fixed together, they may not fit into a corresponding jacket and the incorrect assembling may be discovered during the installation.

According to a further aspect, a clamping system is provided, comprising at least two of the inventive clamping apparatuses, wherein the at least two clamping apparatuses are connected by at least four fixing devices selected from the group of fixing devices consisting of a bolt, a pin, a screw, a clip and a rivet.

A clamping system may allow for a secure connection of tubes wherein the clamping system is resilient to a single failure.

According to another aspect, a tube system is provided, comprising a first tube with a first flange and a second tube with a second flange, wherein the first flange and the second flange are connected by at least one of the inventive clamping apparatuses and/or by at least one inventive clamping system.

According to yet another aspect, at least one of the first tube and the second tube is/are a hose.

In one exemplary embodiment, the tube system further comprises a jacket, wherein the first tube and the second tube and the clamping apparatus and/or the clamping system are surrounded by the jacket. In an example, the jacket may be another tube.

According to another aspect, the tube system is built as a hose-in-shroud system.

According to a further aspect, an airplane is provided, comprising at least one of the inventive clamping apparatuses, the inventive clamping system and the inventive tube system.

The operation security may be increased by using the inventive clamping apparatus, the inventive clamping system and/or the inventive tube system in an airplane or aircraft.

BRIEF DESCRIPTION OF THE DRAWINGS

Exemplary embodiments of the present invention will be described in the following, with reference to the following drawings. The illustration in the drawings is schematic and may be not to scale. In different drawings, similar or identical elements are provided with the same reference numerals.

DETAILED DESCRIPTION OF THE PREFERRED EMBODIMENTS

Figure 1:
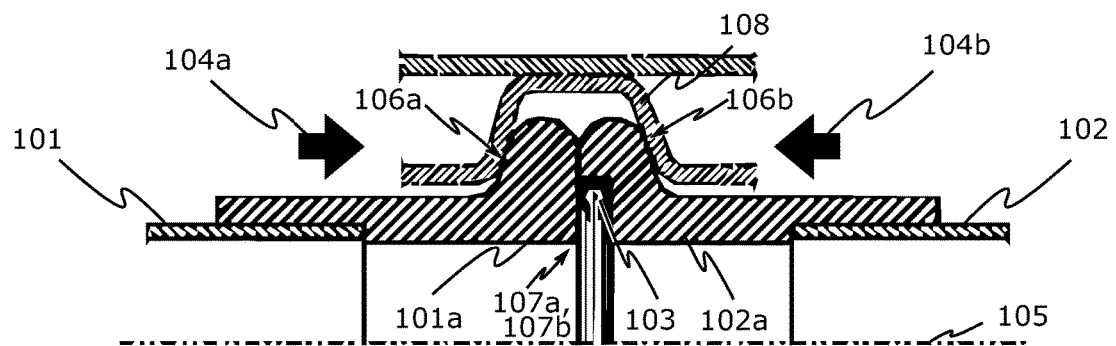
FIG. 1 shows a schematic partial cross section view of a V-flange connection for a better understanding of the present invention.

FIG. 1 shows a schematic partial cross section view of a V-flange connection for a better understanding of the present invention. In this connection two tubes, e.g., a first hose 101 and a second hose 102, are to be connected. Each hose 101, 102 has a flange 101*a*, 102*a* formed at their respective ends. In order to prevent any material transported inside the hoses 101, 102 from leaking out of the connection of the first hose 101 with the second hose 102 the first flange 101*a* and the second flange 102*a* are pressed together in an axial direction 104*a*, 104*b* in order to form a press fit and/or a seal. The axial direction 104*a*, 104*b* is substantially a direction along the virtual longitudinal axis 105 and/or in parallel thereto. A seal 103 that is used between the first and second flanges 101*a*, 102*a* and that is substantially surrounding the virtual longitudinal axis 105, may additionally help to seal the connection of the first and second flanges 101*a*, 102*a*. In order to provide space for the seal 103 one of the connection surfaces 107*a*, 107*b* may have a step.

An axial direction 104*a*, 104*b* may be any direction parallel to the longitudinal axis 105. In order to generate pressure in the axial direction 104*a*, 104*b*, one end of each hose 101, 102 is angled compared to the radial direction. The radial direction may be substantially perpendicular to the longitudinal axis 105.

The angled ends 106*a*, 106*b* of the flanges 101*a*, 102*a* are distant from the connection surfaces 107*a*, 107*b*. The connection surfaces 107*a*, 107*b* are orientated substantially perpendicular to the longitudinal axis 105, i.e., in radial direction.

Clamp 108 has a V-shaped cross sectional profile and generates an axial force to the connection surfaces 107*a*, 107*b* when a radial force in the direction to the longitudinal axis 105 is applied to the clamp 108.

Figure 2:
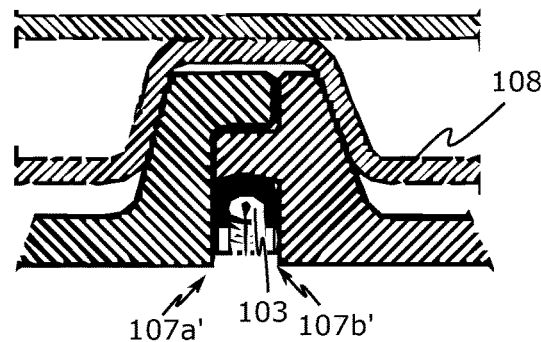
FIG. 2 shows a schematic partial cross section view of a V-flange connection for a flange with stepped connection surfaces for a better understanding of the present invention.

FIG. 2 shows a schematic partial cross section view of a V-flange connection for a flange with stepped connection surfaces 107*a*', 107*b*' for a better understanding of the present invention. The steps built in the connection surface 107*a*' of the first flange and the connection surface 107*b*' of the second flange allow for forming a further barrier in order to provide a high sealing effect for a tube connection.

Figure 3:
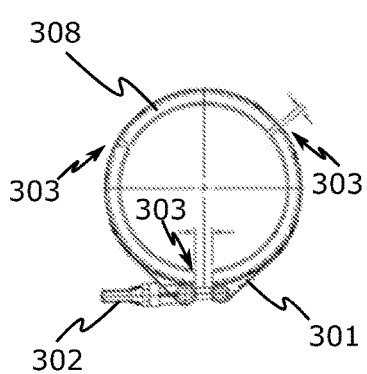
FIG. 3 shows a front view of a V-shaped band for a better understanding of the present invention.

FIG. 3 shows a front view of a V-shaped band for a better understanding of the present invention. In this design, a sheet metal retainer 308 is surrounded by a band 301 or strap 301 with tangential wraps. The band 301 is tightened by a T-bolt 302 which connects two ends of the band 301 and allows to vary the diameter in radial direction of a circle and/or of a cylinder formed by the sheet metal retainer 308. In order to be flexible for diameter variation the sheet metal retainer 308 comprises retainer gaps 303.

The band 301 is made of flexible material and/or of a flexible design.

Figure 4:
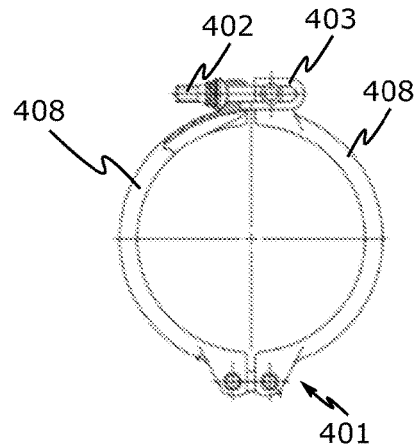
FIG. 4 shows a front view of a V-shaped retainer for a better understanding of the present invention.

FIG. 4 shows a front view of a V-shaped retainer for a better understanding of the present invention. In this design, two trunnion retainer halves 408 are connected by a rivet hinge 401. Opposite of the rivet hinge 401 an eye-bolt 402 in a safety latch 403 is used to generate a radial force substantially in the direction to the center of a circle formed by the trunnion retainer halves 408.

The trunnion retainer halves 408 are made of rigid material and/or of rigid design.

Figure 5:
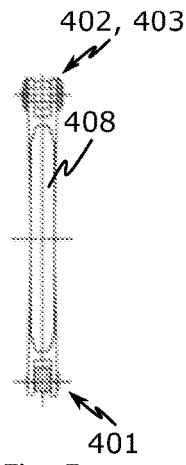
FIG. 5 shows a side view of the V-shaped retainer of FIG. 4 for a better understanding of the present invention.

FIG. 5 shows a side view of the V-shaped retainer of FIG. 4 for a better understanding of the present invention.

The connectors shown in FIGS. 1 to 5 show V-clamp connections that are typically used on different aircraft. Different standards are available for such pneumatic connectors.

Figure 6:
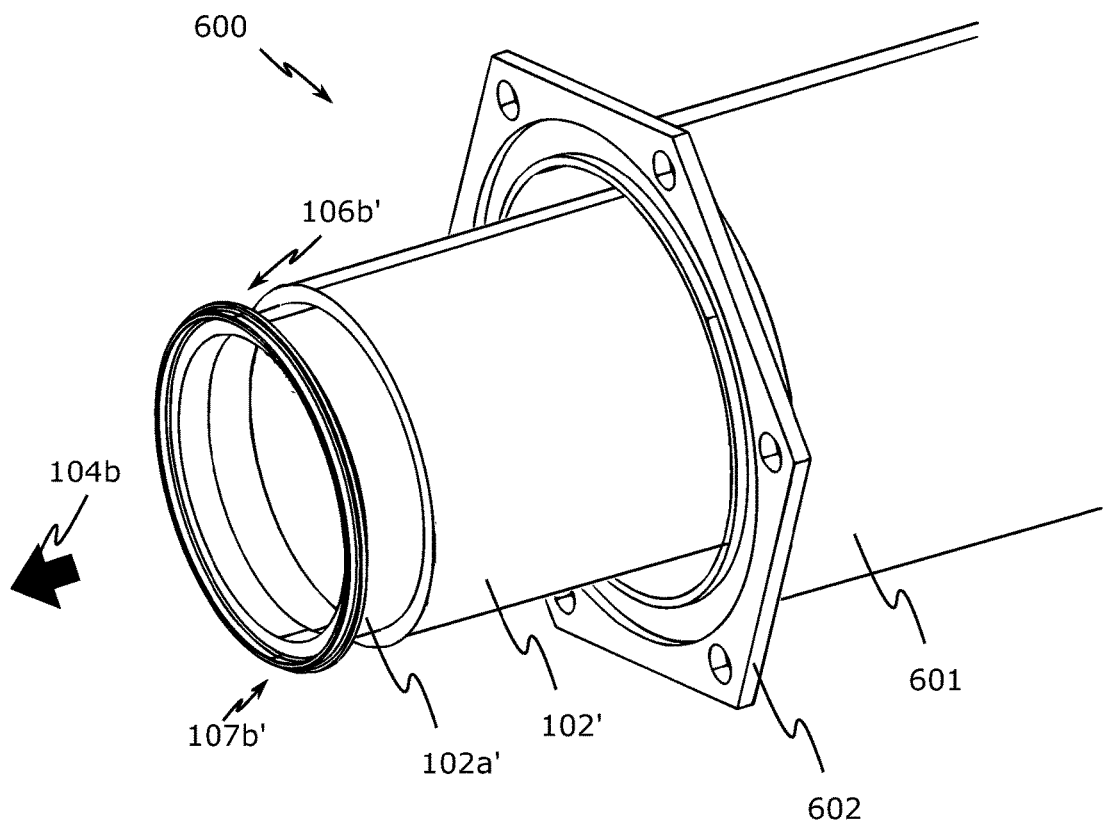
FIG. 6 shows a perspective view of a hose-in-shroud arrangement according to an exemplary embodiment of the present invention.

FIG. 6 shows a perspective view of a hose-in-shroud arrangement according to an exemplary embodiment of the present invention.

A hose-in-shroud arrangement 600 may be used for distribution of H2 to engines or fuel-cells in an airplane. As shown in FIG. 6, the hose-in-shroud arrangement 600 is double-walled, so that any leakage of H2 can be detected and safety measures can be taken. The protection tube 601, shroud 601 or jacket 601 is a tube with a flange 602 for connecting to another shroud (not shown in FIG. 6).

During the installation of a hose-in-shroud arrangement 600 and/or of a hose-in-shroud system 600 a tube 102', e.g., a hose, is fed through the shroud 601 to form a substantially coaxial arrangement. To allow this arrangement inside the shroud 601, any connection including a clamp fixing the connection needs to be smaller than the inner diameter of the shroud 601.

The tube 102' extends into an axial direction 104*b*. The end of the tube 102' protruding from the shroud 601 has a flange 102*a*' which may be used to connect to another tube (not shown in FIG. 6) for extending the length for a corresponding tube system. The flange 102*a*' has the contacting surface 107*b*' or connection surface 107*b*' for directly contacting the other tube and an angled, sloped and/or declined surface 106*b*'. The angled surface 106*b*' faces the flange 602.

Figure 7:
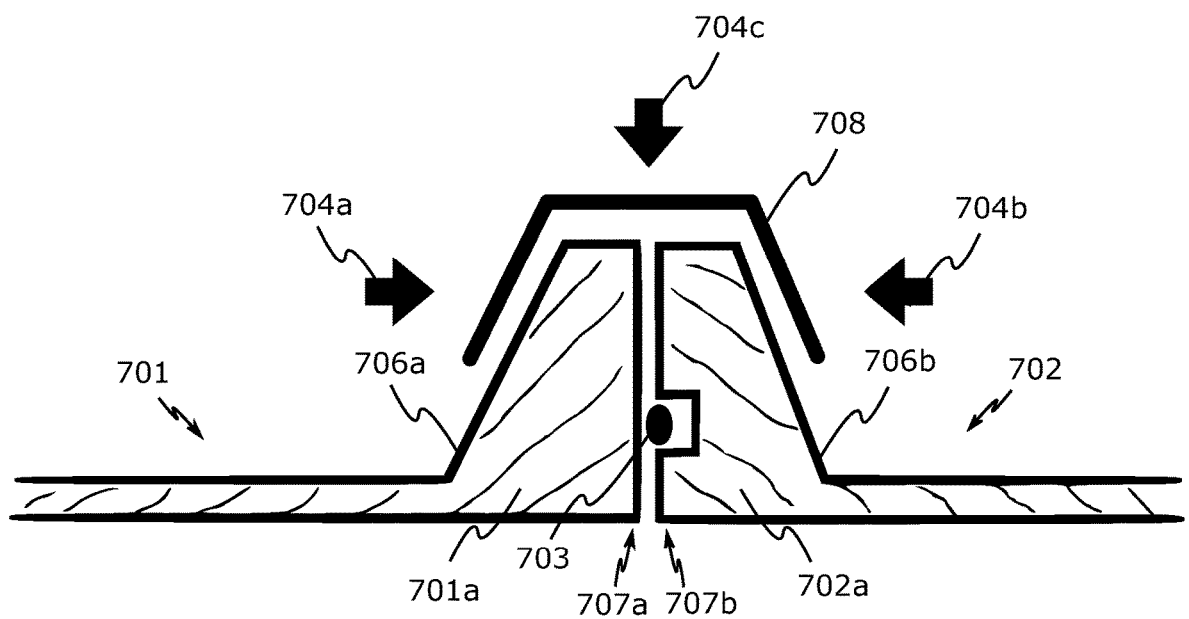
FIG. 7 shows a schematic partial cross-sectional view of a force distribution on a connection of two flanges according to an exemplary embodiment of the present invention.

FIG. 7 shows a schematic partial cross-sectional view of a force distribution on a connection of two flanges 701*a*, 702*a* according to an exemplary embodiment of the present invention.

A V-shaped first bracing device 708 or clamp 708 is pressed in a radial direction 704*c* towards the surface of a tube 701, 702. When the radial force is applied to the outer wall of the first bracing device 708, the V-shape of the first bracing device 708 converts the radial force into an axial force in axial directions 704*a*, 704*b*. The radial force is directed to a longitudinal axis (not shown in FIG. 7) of the tubes 701, 702 and/or to a center (not shown in FIG. 7) of tubes 701, 702. In other words, the radial force is directed substantially parallel to the connection surfaces 707*a*, 707*b*.

The axial directions 704*a*, 704*b* are substantially directed in opposite axial directions and are directed towards another. This pressure towards another forms a press fit which also seals the inside of tubes 701, 702 from the outside, i.e., the gap between tube 102', 701, 702 and a corresponding shroud 601. The sealing effect of the press fit is supported by an additional sealing element 703, e.g., an O-ring.

The flanges 701*a*, 702*a* have angled surfaces 706*a*, 706*b* or angled planes 706*a*, 706*b* and are attached to the end of the tubes 701, 702 which need to be connected. A combination of the V-shaped first bracing device 708 and the substantially V-shaped angled surfaces 706*a*, 706*b* of the flanges 701*a*, 702*a* presses the flanges 701*a*, 702*a* together and provides the tightness for the connection of the tubes 701, 702.

The tightness of the connection allows for using a tube system 701, 702 connected with a bracing device for the transport of H2. The connections meet the special requirements with regard to preventing leakage of H2 through the coupling. Such a connection solution helps to replace a Harrison fitting with a swivel nut which may not be appropriate for the transport of H2 due to the leakages for gas through a Harrison fitting.

Figure 8:
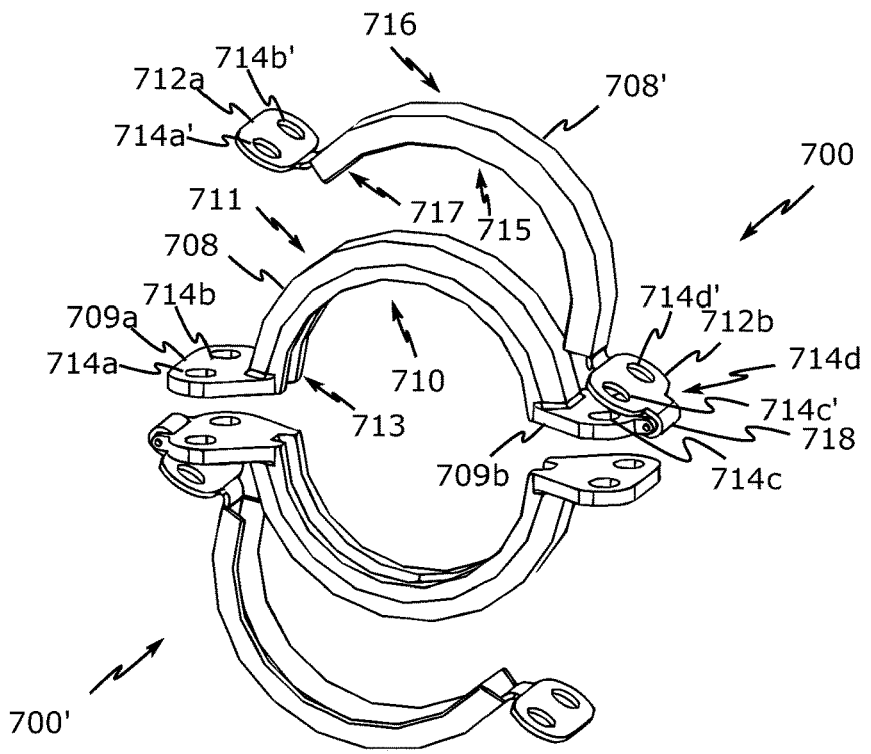
FIG. 8 shows two clamping apparatuses in an open position according to an exemplary embodiment of the present invention.

FIG. 8 shows two clamping apparatuses 700, 700' in an open position according to an exemplary embodiment of the present invention.

In the following, only one clamping apparatus 700 of the two clamping apparatuses 700, 700' is described in detail because the structure of the other clamping apparatus 700' is substantially the same. Each of the two clamping apparatuses 700, 700' has substantially the shape of a half circle.

The clamping apparatus 700 comprises a first bracing device 708 and a second bracing device 708'. The first bracing device 708 connects a first mounting device 709a and a second mounting device 709b. In other words, the first bracing device 708 is positioned between the first mounting device 709a and the second mounting device 709b. The first bracing device 708 has a partially circular and/or cylindrical shape with a first inner wall 710 and a first outer wall 711.

The second bracing device 708' connects a first connecting device 712a and a second connecting device 712b. In other words, the second bracing device 708' is positioned between the first connecting device 712a and the second connecting device 712b.

The shape of the first mounting device 709a and the second mounting device 709b, and the first connecting device 712a and the second connecting device 712b, substantially correspond to another.

The first inner wall 710 of the first bracing device 708 has a first recess 713.

The first outer wall 711 of the first bracing device 708 is adapted to contact the second bracing device 708'.

The second bracing device 708' is adapted to contact the first outer wall 711 of the first bracing device 708 in order to apply a substantially radial force on the first outer wall 711 of the first bracing device 708. The radial force is a force substantially directed in a radial direction 704c, which is the direction towards an imaginary center of the circular shape of the first bracing device 708. The center may correspond to a longitudinal axis of a tube that is to be connected to another tube using the first bracing device 708 (the tubes are not shown in FIG. 8).

The shape of the first recess 713 is a V-shape and is adapted to substantially convert the radial force applied to the first outer wall 711 of the first bracing device 708 into an axial force inside the first inner wall 710, in particular when it gets into contact with the angled surfaces 706a, 706b of a flange 701a, 702a.

The first mounting device 709a and the second mounting device 709b of the first bracing device 708 each comprise at least two attachment devices 714a, 714b, 714c, 714d for connecting the first connecting device 712a and the second connecting device 712b of the second bracing device 708'.

The second bracing device 708 comprises corresponding attachment devices 714a', 714b', 714c', 714d' which may be aligned with the at least two attachment devices 714a, 714b, 714c, 714d.

By connecting the first bracing device 708 and the second bracing device 708' the second bracing device 708' becomes a secondary load path for the primary load path of the first bracing device 708. Providing at least two load paths allows for a single failure of one of the first bracing device 708 and the second bracing device 708'.

Mounting the first bracing device 708 and/or the second bracing device 708' to a mount and/or to a second clamping apparatus 700' substantially allows for generating the force in a radial direction. This radial force may be generated in the first load-path and/or the second load-path, formed by the first bracing device 708 and the second bracing device 708' respectively.

The attachment devices 714a, 714b, 714c, 714d, 714a', 714b', 714c', 714d', e.g., holes and/or bores, may receive a fixing device (not shown in FIG. 8) 901a, 901b, 901c, 901d in order to mount the first bracing device 708 and/or the second bracing device 708'. The fixing device may be used to generate a radial force by moving the clamping apparatus 700' in a radial direction of a tube system. In other words, the fixing device may be substantially positioned for generating a force in the radial direction 704c. In an example, the fixing device 901a, 901b, 901c, 901d is positioned substantially perpendicular to a longitudinal axis of a tube to be connected. In another example, the fixing device 901a, 901b, 901c, 901d is arranged along a tangential direction to at least one of the first bracing device 708 and/or the second bracing device 708'. Examples for a fixing device 901a, 901b, 901c, 901d are a bolt, a pin, a screw, a clip and a rivet.

The design of the clamping apparatus 700, 700' allows for a single failure without substantially breaking the connection of the tubes. The second bracing device 708' may be used as a shelter for the first bracing device 708. In this way also a second load-path for the clamp is provided and a clamp-connection uses at least 4 fixing devices 901a, 901b, 901c, 901d and corresponding attachment devices 714a, 714b, 714c, 714d, 714a', 714b', 714c', 714d' instead of only 1 or 2. In other words, every fixing device 901a, 901b, 901c, 901d and/or attachment devices 714a, 714b, 714c, 714d, 714a', 714b', 714c', 714d is doubled in order to allow for a single failure. In one example one fixing device is used to link two attachment devices 714a, 714b, 714c, 714d, 714a', 714b', 714c', 714d' of the first bracing device 708 and the second bracing device 708', respectively. One fixing device links the first bracing device 708 with the second bracing device 708'. In other words, for every bracing device 708, 708' the appropriate number of fixing and/or attachment devices is provided such as each single bracing device 708, 708' alone were responsible of forming the tube connection.

The clamping apparatus 700 can be used for an H2-distribution system. Substantially all components are at least doubled in order to allow for a redundant design. The clamping apparatus 700 and/or a V-clamp connection formed with the clamping apparatus 700 may prevent a complete damage and loss of the functionality due to a single failure.

The clamping apparatus 700, 700' is small enough to be fed through a shroud 601. The robustness against a single failure allows for a low maintenance inside the shroud 601.

The second bracing device 708' has a partially circular and/or cylindrical shape with a second inner wall 715 and a second outer wall 716. The second inner wall 715 of the second bracing device 708' has a second recess 717, wherein the shape of the second recess 717 is adapted to engage with the first outer wall 711 of the first bracing device 708. In an example, the second recess 717 has a V-shape and/or the first outer wall 711 of the first bracing device 708 has a V-shape as well. In order to embed the first bracing device 708 into the second bracing device 708' the dimensions of the second bracing device 708' are larger than the dimensions of the first bracing device 708. In a case of just embedding, the first bracing device 708 and second bracing device 708' may touch another without substantially executing pressure to another. Only when the inner bracing device may break, the pressure is executed by the outer bracing device.

On one side of first mounting device 709a, and/or the second mounting device 709b, and the first connecting device 712a, and/or the second connecting device 712b, the first bracing device 708 and the second bracing device 708' are connected by a hinge 718. The hinge 718 may help to let a user who handles the clamping apparatus 700, 700' recognize if the clamping apparatus 700, 700' is not yet ready to be mounted inside the shroud. The hinge 718 also prevents that only one clamping apparatus 700, 700' of the first bracing device 708 and/or the second bracing device 708' is installed. As the first bracing device 708 and/or the second bracing device 708' are always linked by the hinge 718, it is substantially impossible to forget one of the redundant parts of the clamping apparatus 700, 700' when a tube connection is made.

In one example, the hinge 718 may be used as a leverage in order to apply a substantially radial force on the first outer wall 711 of the first bracing device 708 and/or to build up a tension. The final pressure to the flanges of a tube may be generated by attaching the clamping apparatus to a mount.

The hinge 718 is an additional attachment device and/or fixing device on the side where it is used. In this way the side where the hinge 718 is used has three attachment devices. In other words, the side where the hinge 718 is used may only uses one single of the attachment devices 714a, 714b, 714c, 714d, 714a', 714b', 714c' and uses the hinge 718 as the second attachment device in order to still allow for a single failure.

Figure 9:
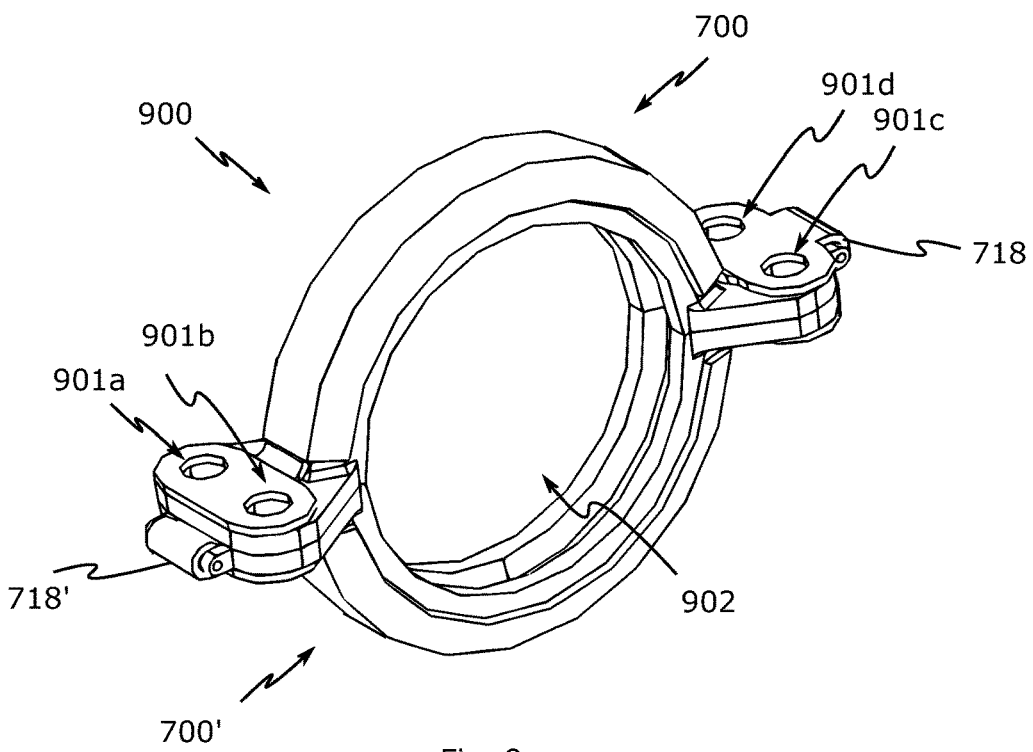
FIG. 9 shows a clamping system in a closed position according to an exemplary embodiment of the present invention.

FIG. 9 shows a clamping system 900 in a closed position according to an exemplary embodiment of the present invention.

The clamping system 900 comprises the first clamping apparatus 700 and the second clamping apparatus 700', wherein the two clamping apparatuses 700, 700' are connected by four fixing device 901a, 901b, 901c, 901d, e.g., four bolts. An additional fixing device is formed by the hinges 718, 718'.

The clamping system 900 can be used to connect two tubes (not shown in FIG. 9) inside the substantially circular opening 902 surrounded by the two clamping apparatuses 700, 700'. The contour of the circular opening 902 substantially corresponds to the contour of the tubes to be connected.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS 101 first hose
101a first flange
102 second hose
102' tube inside a shroud
102a second flange
103 seal
104a, 104b axial direction
105 longitudinal axis
106a angled end of first flange
106b angled end of second flange
107a connection surface of first flange
107b connection surface of second flange
107a' stepped connection surface of first flange
107b' stepped connection surface of second flange
108 clamp
301 band
302 T-bolt
303 retainer gaps
308 sheet metal retainer
401 rivet hinge
402 eye-bolt
403 safety latch
408 trunnion retainer halves
600 hose-in-shroud arrangement
601 shroud
602 flange of jacket
700 first clamping apparatus
700' second clamping apparatus
701 first tube
702 second tube
701a first flange
702a second flange
703 sealing element
704a first axial direction
704b second axial direction
704c radial direction
706a first angled surface
706b second angled surface
707a first connection surface
707b second connection surface
708 first bracing device
708' second bracing device
709a first mounting device
709b second mounting device
710 first inner wall
711 first outer wall
712a first connecting device
712b second connecting device
713 first recess
714a, 714b,
714c, 714d attachment devices of the first bracing device
714a', 714b',
714c', 714d' attachment devices of the second bracing device
715 second inner wall
716 second outer wall.
717 second recess
718 hinge
718' hinge
900 clamping system
901a, 901b,
901c, 901d fixing device
902 opening

The invention claimed is:

1. A clamping apparatus for connecting flanges of tubes, comprising:
a first bracing device;
a second bracing device;
wherein the first bracing device connects a first mounting device and a second mounting device;

wherein the first bracing device has a partially circular shape with a first inner wall and a first outer wall;
wherein the second bracing device connects a first connecting device and a second connecting device;
wherein the first inner wall of the first bracing device has a first recess which has a V-shape;
wherein the first outer wall of the first bracing device is configured to contact the second bracing device;
wherein the second bracing device is configured to contact the first outer wall of the first bracing device in order to apply a substantially radial force on the first outer wall of the first bracing device;
wherein the second bracing device is disposed over the first bracing device, such that the second bracing device is adapted to cover the first bracing device;
wherein the shape of the first recess is configured to substantially convert the substantially radial force applied to the first outer wall of the first bracing device into an axial force inside the first inner wall; and
wherein the first mounting device and the second mounting device each comprise at least two attachment devices for connecting the first connecting device and the second connecting device of the second bracing device.

2. The clamping apparatus of claim 1, wherein the second bracing device is at least one of at least partially made of a substantially flexible material or configured as a flexible element.

3. The clamping apparatus of claim 1, wherein the second bracing device is at least partially made of a substantially rigid material.

4. The clamping apparatus of claim 1,
wherein the second bracing device has a partially circular shape with a second inner wall and a second outer wall;
wherein the second inner wall of the second bracing device has a second recess; and
wherein a shape of the second recess is configured to engage with the first outer wall of the first bracing device.

5. The clamping apparatus of claim 4, wherein the second recess has a V-shape.

6. The clamping apparatus of claim 1,
wherein the at least two attachment devices are configured to receive at least one fixing device selected from a group of fixing devices consisting of:
a bolt;
a pin;
a screw;
a clip; and
a rivet.

7. The clamping apparatus of claim 1, wherein the first bracing device and the second bracing device are connected to another.

8. The clamping apparatus of claim 7, wherein the first bracing device and the second bracing device are connected to one another by a hinge.

9. A clamping system, comprising:
at least two clamping apparatuses of claim 1,
wherein the at least two clamping apparatuses are connected by at least four fixing devices selected from a group of fixing devices consisting of:
a bolt;
a pin;
a screw;
a clip; and
a rivet.

10. A tube system, comprising:
a first tube with a first flange;
a second tube with a second flange;
wherein the first flange and the second flange are connected by the clamping system of claim 9.

11. The tube system of claim 10, wherein at least one of the first tube and the second tube is a hose.

12. The tube system of claim 11, further comprising:
a jacket;
wherein the first tube and the second tube and at least one of the clamping apparatus or the clamping system are surrounded by the jacket.

13. The tube system of claim 12, wherein the tube system is built as a hose-in-shroud system.

14. An airplane comprising at least one clamping apparatus of claim 1.

15. An airplane comprising the clamping system of claim 9.

16. A tube system, comprising:
a first tube with a first flange;
a second tube with a second flange;
wherein the first flange and the second flange are connected by a clamping apparatus, the clamping apparatus comprising:
a first bracing device;
a second bracing device;
wherein the first bracing device connects a first mounting device and a second mounting device;
wherein the first bracing device has a partially circular shape with a first inner wall and a first outer wall;
wherein the second bracing device connects a first connecting device and a second connecting device;
wherein the first inner wall of the first bracing device has a first recess;
wherein the first outer wall of the first bracing device is configured to contact the second bracing device;
wherein the second bracing device is configured to contact the first outer wall of the first bracing device in order to apply a substantially radial force on the first outer wall of the first bracing device;
wherein the shape of the first recess is configured to substantially convert the substantially radial force applied to the first outer wall of the first bracing device into an axial force inside the first inner wall; and
wherein the first mounting device and the second mounting device each comprise at least two attachment devices for connecting the first connecting device and the second connecting device of the second bracing device.

17. The tube system of claim 16, wherein at least one of the first tube and the second tube is a hose.

18. The tube system of claim 17, further comprising:
a jacket;
wherein the first tube and the second tube and at least one of the clamping apparatus or the clamping system are surrounded by the jacket.

19. The tube system of claim 18, wherein the tube system is built as a hose-in-shroud system.

20. A clamping apparatus for connecting flanges of tubes, comprising:
a first bracing device;
a second bracing device;
wherein the first bracing device connects a first mounting device and a second mounting device;
wherein the first bracing device has a partially circular shape with a first inner wall and a first outer wall;

wherein the second bracing device connects a first connecting device and a second connecting device;
   wherein the first inner wall of the first bracing device has a first recess;
   wherein the first outer wall of the first bracing device is configured to contact the second bracing device;
   wherein the second bracing device is configured to contact the first outer wall of the first bracing device in order to apply a substantially radial force on the first outer wall of the first bracing device;
   wherein the shape of the first recess is configured to substantially convert the substantially radial force applied to the first outer wall of the first bracing device into an axial force inside the first inner wall;
   wherein the first mounting device and the second mounting device each comprise at least two attachment devices for connecting the first connecting device and the second connecting device of the second bracing device;
   wherein the first bracing device and the second bracing device are connected to one another by a hinge.

\* \* \* \* \*